(12) United States Patent
Chen

(10) Patent No.: US 9,169,673 B2
(45) Date of Patent: Oct. 27, 2015

(54) BICYCLE LOCKING AND PARKING DEVICE

(71) Applicant: GIANT MANUFACTURING CO., LTD., Taichung (TW)

(72) Inventor: Mu-Tsun Chen, Miaoli County (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 14/517,935

(22) Filed: Oct. 20, 2014

(65) Prior Publication Data

US 2015/0117935 A1    Apr. 30, 2015

(30) Foreign Application Priority Data

Oct. 24, 2013 (TW) .............................. 102219833 U

(51) Int. Cl.
*E05B 71/00* (2006.01)
*E05B 47/00* (2006.01)

(52) U.S. Cl.
CPC .............. *E05B 71/00* (2013.01); *E05B 47/0001* (2013.01); *E05B 2047/0048* (2013.01); *E05B 2047/0072* (2013.01); *Y10T 70/5872* (2015.04); *Y10T 70/5876* (2015.04); *Y10T 70/5881* (2015.04)

(58) Field of Classification Search
CPC ...... B62H 2003/005; B62H 1/00; B62H 3/00; B62H 3/04; B62H 5/00; B62H 5/005; B62H 5/06; B62H 2700/00; B62H 2700/005; E05B 47/0001; E05B 2047/0048; E05B 2047/0072; E05B 71/00; Y10T 70/5872; Y10T 70/5876; Y10T 70/5881

USPC .................. 70/62, 233–236, 225, 228, 279.1; 280/288.4; 211/5, 17–24; 248/551–553

See application file for complete search history.

(56) References Cited

U.S. PATENT DOCUMENTS

| | | | | |
|---|---|---|---|---|
| 4,830,167 | A * | 5/1989 | Lassche | 194/247 |
| 5,917,407 | A * | 6/1999 | Squire et al. | 340/432 |
| 6,199,416 | B1 * | 3/2001 | Wu | 70/227 |
| 6,453,706 | B1 * | 9/2002 | Chen | 70/33 |
| 2008/0041127 | A1 * | 2/2008 | Xavier et al. | 70/228 |
| 2008/0156050 | A1 * | 7/2008 | Konno et al. | 70/233 |
| 2009/0266673 | A1 * | 10/2009 | Dallaire et al. | 194/205 |
| 2011/0148346 | A1 * | 6/2011 | Gagosz et al. | 320/103 |
| 2011/0226709 | A1 * | 9/2011 | Yen et al. | 211/17 |
| 2012/0192601 | A1 * | 8/2012 | Kooijmans | 70/233 |

* cited by examiner

*Primary Examiner* — Lloyd Gall
(74) *Attorney, Agent, or Firm* — CKC & Partners Co., Ltd.

(57) ABSTRACT

A bicycle locking and parking device for parking a bicycle is provided. The bicycle locking and parking device comprises a parking seat, a control module, a locking unit, and a bicycle locking mechanism. The bicycle locking mechanism comprises a locking groove, a first locking member, a reciprocating displacement limiter, a second locking member, and a third locking member. Wherein, the control module drives the third locking member, and the control module cooperates with the second locking member to make the displacement path of the lock-in part being closed. The positioning convex is embedded to the positioning groove, and the locking unit is locked in the bicycle locking mechanism. The present disclosure can avoid the adverse effects or the trouble accident.

13 Claims, 9 Drawing Sheets

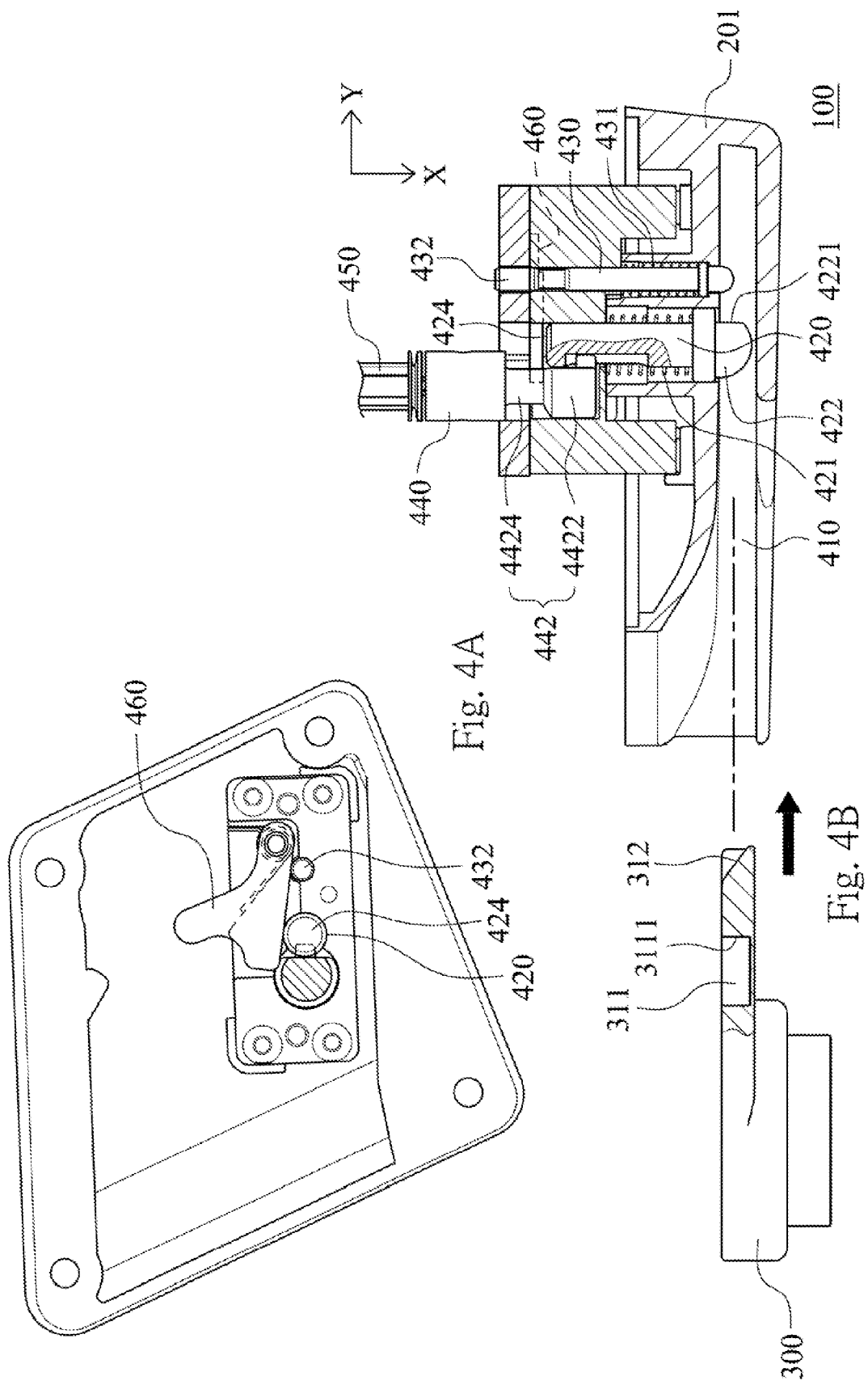

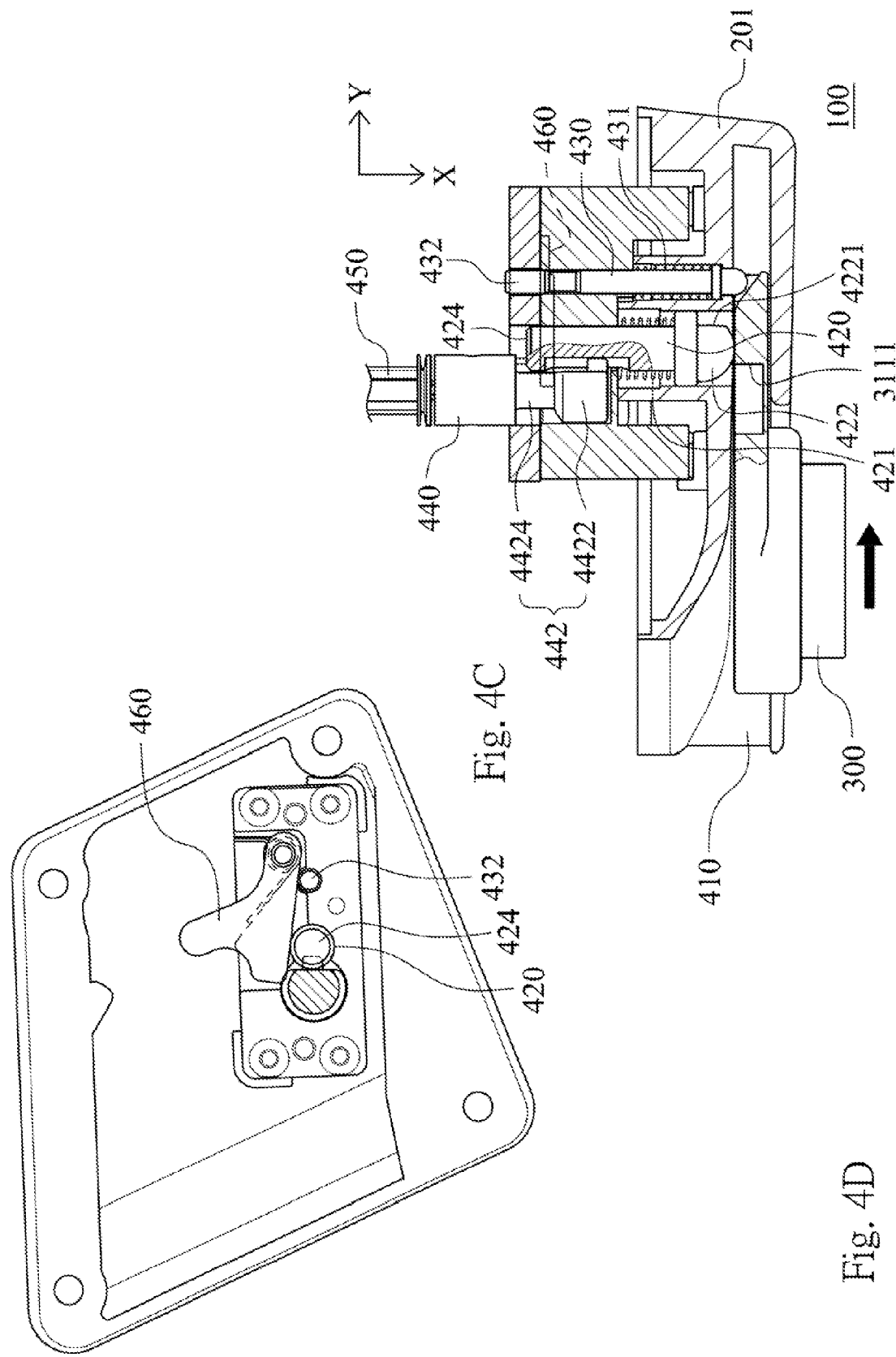

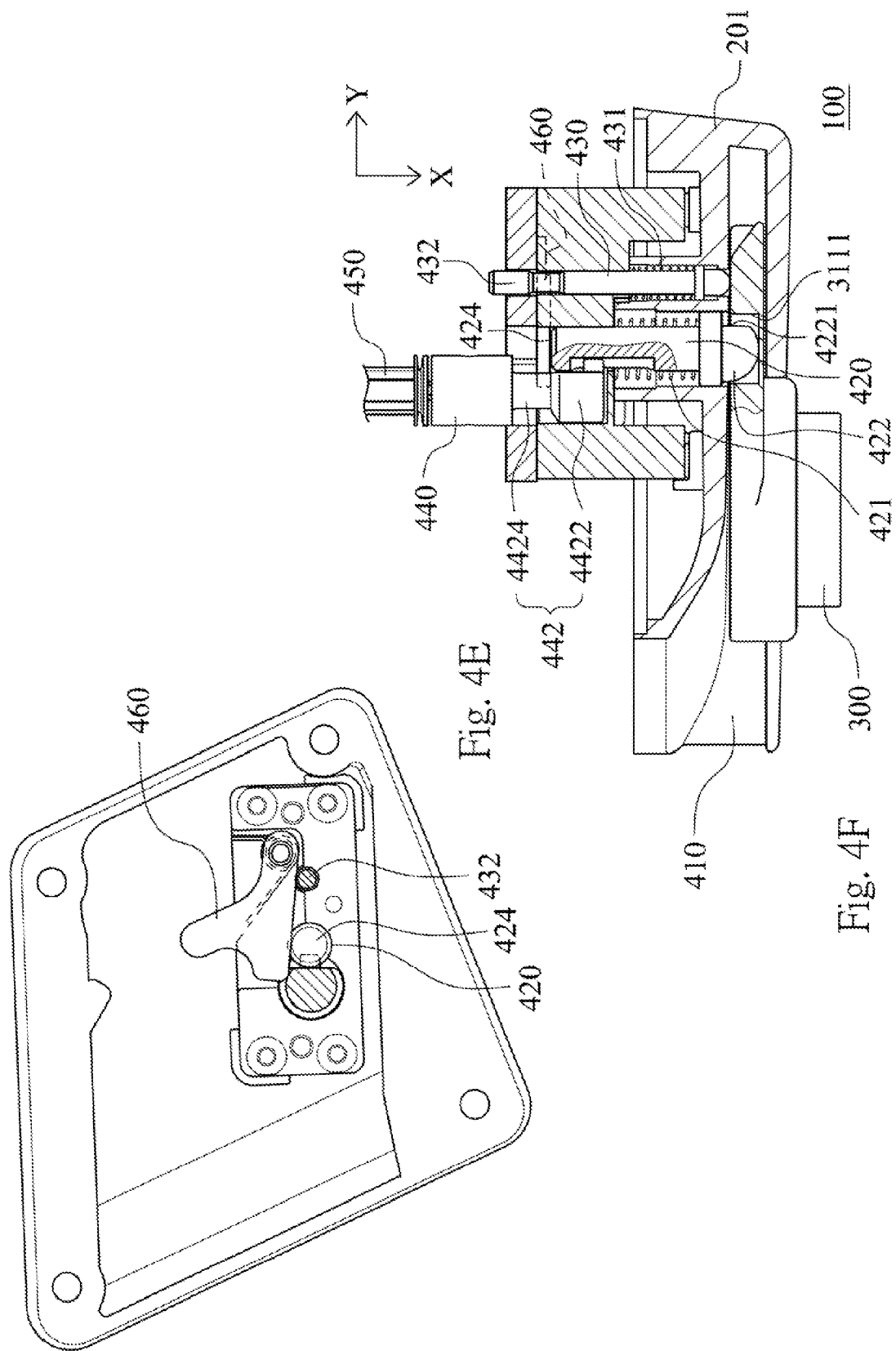

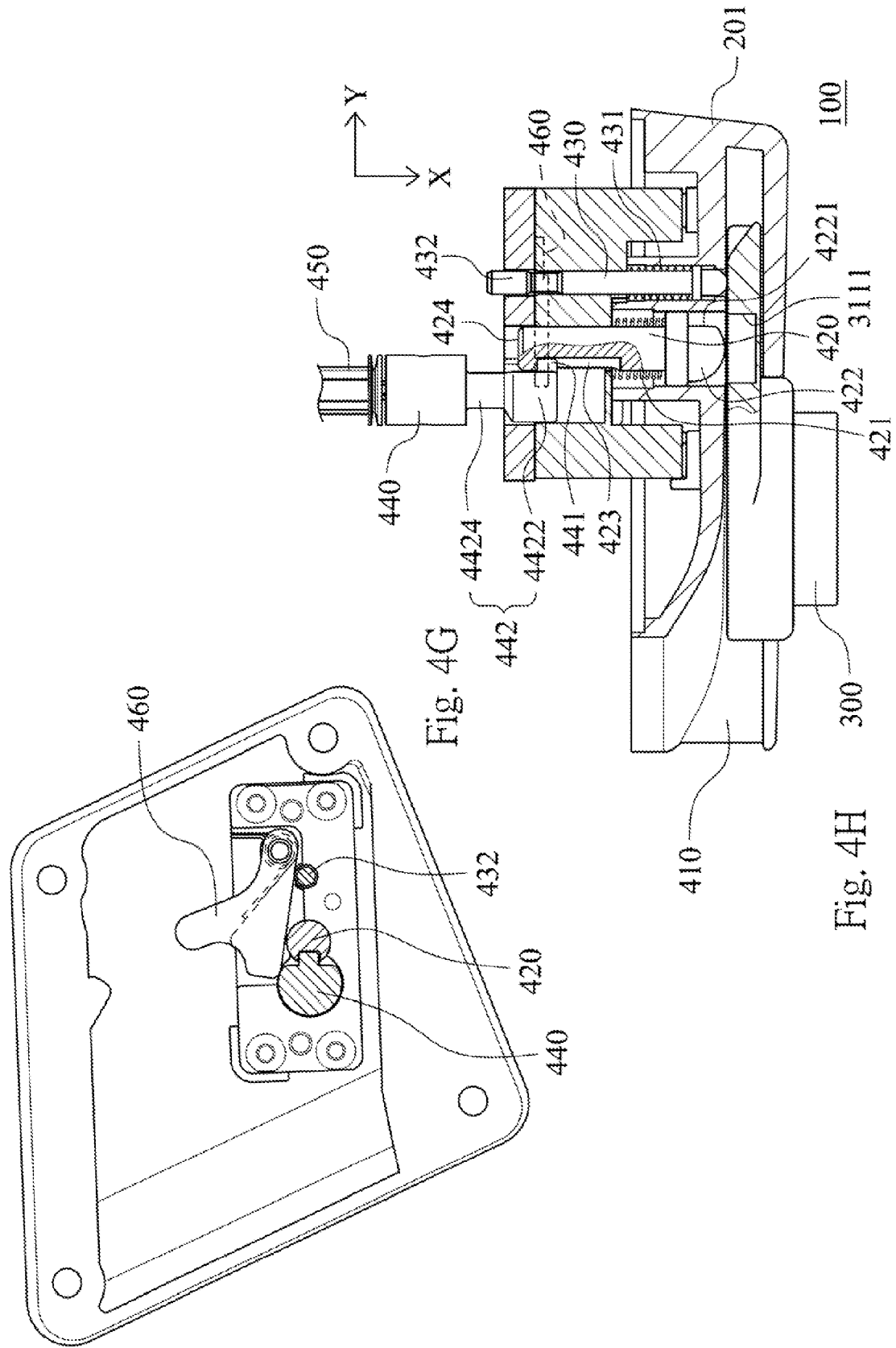

BICYCLE LOCKING AND PARKING DEVICE

RELATED APPLICATIONS

This application claims priority to Taiwan Application Serial Number 102219833 filed Oct. 24, 2013, which is herein incorporated by reference.

BACKGROUND

1. Technical Field

The present disclosure relates to a locking device. More particularly, the present disclosure relates to a locking and parking device for a bicycle.

2. Description of Related Art

In recent years, bicycle riding has become an alternative to foot walking of people. In addition to great promotion on riding bicycle, the government is also committed to exclusive bicycle lanes. However, a bicycle rider always has a large concern on the safety of parking his bicycle. This problem may be solved by constructing a parking space that cooperates with a bicycle safety locking system by the government or people in the related industry.

The public bicycle may be a good choice to achieve the aforementioned purpose, however, there still exists a problem. The problem is that the bicycle safety locking system of the public bicycle can't work or only can work once during a power cut. Therefore the bicycle rider can't lock and park his bicycle at the bicycle safety locking system during the power cut. Moreover, if some pranksters touch a locking tab of the bicycle safety locking system with a pinhead, the bicycle safety locking system will be locked without any bicycle. The problem caused by the power cut or human error needs to be solved.

Moreover, the conventional bicycle safety locking system of the public bicycle has many complicated structures for electronic records and managements, thus managing the bicycle safety locking system is difficult. On the other hand, the problem caused by the power cut or the human error will limit the utilization and the application rate of the public bicycle.

SUMMARY

A bicycle locking and parking device for parking a bicycle is provided in the present disclosure. The present disclosure can avoid the adverse effects during a power cut or the human error, and the present disclosure is suitable for different kinds and brands of bicycle.

According to one aspect of the present disclosure, a bicycle locking and parking device for parking a bicycle is provided. The bicycle locking and parking device comprises a parking seat, a control module, a locking unit, and a bicycle locking mechanism. The control module is disposed on the parking seat. The locking unit has a positioning groove and the locking unit is prominently mounted on an outside of the bicycle. The bicycle locking mechanism is disposed on the parking seat, wherein the bicycle locking mechanism comprises a locking groove, a first locking member, a reciprocating displacement limiter, a second locking member, and a third locking member. The locking groove has an opening that faces toward a forward direction of the bicycle and the locking unit can be placed and locked in the locking groove by the opening. The first locking member has a reset force and is telescopically located and limited at the locking groove along a wheel axis of the bicycle, and a front end of the first locking member has a positioning convex that corresponds with the positioning groove. A back end of the first locking member has a lock-in part, and a side of the first locking member has a limiting track. The reciprocating displacement limiter has a reset force and is located at the bicycle locking mechanism, and the reciprocating displacement limiter corresponds with the lock-in part and can open or close a displacement path of the lock-in part. The second locking member has a reset force and is telescopically located and limited at the locking groove along the axis, and the second locking member has a blocker that can open or close a displacement path of the reciprocating displacement limiter. The third locking member is telescopically located and limited at the bicycle locking mechanism along the wheel axis, and the third locking member has a guider that is located and limited in the limiting track. The third locking member has a push surface that reciprocally pushes the reciprocating displacement limiter, and the third locking member is extendably controlled by the control module. Wherein, the control module drives the third locking member, and the control module cooperates with the second locking member to make the displacement path of the lock-in part being closed by the reciprocating displacement limiter. The positioning convex is embedded to the positioning groove, and the locking unit is locked in the bicycle locking mechanism.

According to some embodiments of the one aspect of the present disclosure, the control module is electrically driven or manually driven. The reciprocating displacement limiter is pivoted on the bicycle locking mechanism, and the reset force of the reciprocating displacement limiter is a spring or a force of gravity. Besides, an outside of the locking unit has a arch-shaped surface, and the arch-shaped surface cooperates with the second locking member that is located in the locking groove. Wherein the positioning convex has a plane and a curved surface that are opposite to each other. The curved surface cooperates with the arch-shaped surface to make a smooth movement, and the plane cooperates with an outside end of the positioning groove to position the locking unit. Wherein, the parking seat includes two bilateral symmetry bases, an open space is formed between the two bases, and the wheel of the bicycle is located between the open space.

In the foregoing, when the first locking member and the reciprocating displacement limiter are making a locking or releasing movement, the reciprocating displacement limiter can block off the displacement path of the first locking member to finish the locking movement. When first locking member is moved by the third locking member, the push surface will push the reciprocating displacement limiter. Then the reciprocating displacement limiter can be unlocked from the displacement path of the first locking member, and the positioning convex will be unlocked from the positioning groove for releasing the locking unit.

According to another aspect of the present disclosure, a bicycle locking and parking device for parking a bicycle is provided. The bicycle locking and parking device comprises a parking seat, a control module, a locking unit, and a bicycle locking mechanism. The control module is electrically driven and disposed on the parking seat. The locking unit has a positioning groove and the locking unit is prominently mounted on an outside of the bicycle. The bicycle locking mechanism is disposed on the parking seat, wherein the bicycle locking mechanism comprises a locking groove, a first locking member, a reciprocating displacement limiter, a second locking member, and a third locking member. The locking groove has an opening that faces toward a forward direction of the bicycle, and the locking unit can be placed and locked in the locking groove by the opening. The first locking member has a reset force and is telescopically located and limited at the locking groove along a wheel axis of the bicycle, and a front end of the first locking member has a positioning convex that corresponds with the positioning groove. A back end of the first locking member has a lock-in part, and a side of the first locking member has a limiting track. The reciprocating displacement limiter has a reset force and is located at the bicycle locking mechanism, and the reciprocating displacement limiter corresponds with the lock-in part and can open or close a displacement path of the lock-in part. The second locking member has a reset force and is telescopically located and limited at the locking groove along the axis, and the second locking member has a blocker that can open or close a displacement path of the reciprocating displacement limiter. The third locking member is telescopically located and limited at the bicycle locking mechanism along the wheel axis, and the third locking member has a guider that is located and limited in the limiting track. The third locking member has a push surface that reciprocally pushes the reciprocating displacement limiter, and the third locking member is extendably controlled by the control module. Wherein, the control module drives the third locking member, and the control module cooperates with the second locking member to make the displacement path of the lock-in part being dosed by the reciprocating displacement limiter. The positioning convex is embedded to the positioning groove, and the locking unit is locked in the bicycle locking mechanism.

According to one embodiment of another aspect of the present disclosure, the bicycle locking mechanism or the reciprocating displacement limiter has a sensor to send a data and connect to a electrical control system. Therefore, the present disclosure can avoid the power failure and reduce a man-made accident. Wherein, the parking seat comprises two bilateral symmetry bases, an open space is formed between the two bases, and the wheel of the bicycle is located between the open space.

Moreover, the locking unit can be easily installed on the outside surface of a fork, a front wheel axle or a back wheel axle. Therefore, the present disclosure is suitable for different kinds and brands of bicycle.

BRIEF DESCRIPTION OF THE DRAWINGS

The invention can be more fully understood by reading the following detailed description of the embodiment, with reference made to the accompanying drawings as follows:

FIG. 4A is a partial cross-sectional view of the bicycle locking mechanism shown in FIG. 2, when the bicycle locking mechanism doesn't lock the locking unit;

FIG. 4B is another partial cross-sectional view of the bicycle locking mechanism shown in FIG. 2, when the bicycle locking mechanism doesn't lock the locking unit;

FIG. 4C is a partial cross-sectional view of the bicycle locking mechanism shown in FIG. 2, when the bicycle locking mechanism continues to lock the locking unit;

FIG. 4D is another partial cross-sectional view of the bicycle locking mechanism shown in FIG. 2, when the bicycle locking mechanism continues to lock the locking unit;

FIG. 4E is a partial cross-sectional view of the bicycle locking mechanism shown in FIG. 2, when the locking unit is locked at the bicycle locking mechanism;

FIG. 4F is another partial cross-sectional view of the bicycle locking mechanism shown in FIG. 2, when the locking unit is locked at the bicycle locking mechanism;

FIG. 4G is a partial cross-sectional view of the bicycle locking mechanism shown in FIG. 2, when the bicycle locking mechanism unlocks the locking unit;

FIG. 4H is another partial cross-sectional view of the bicycle locking mechanism shown in FIG. 2, when the bicycle locking mechanism unlocks the locking unit;

DETAILED DESCRIPTION

Figure 1:
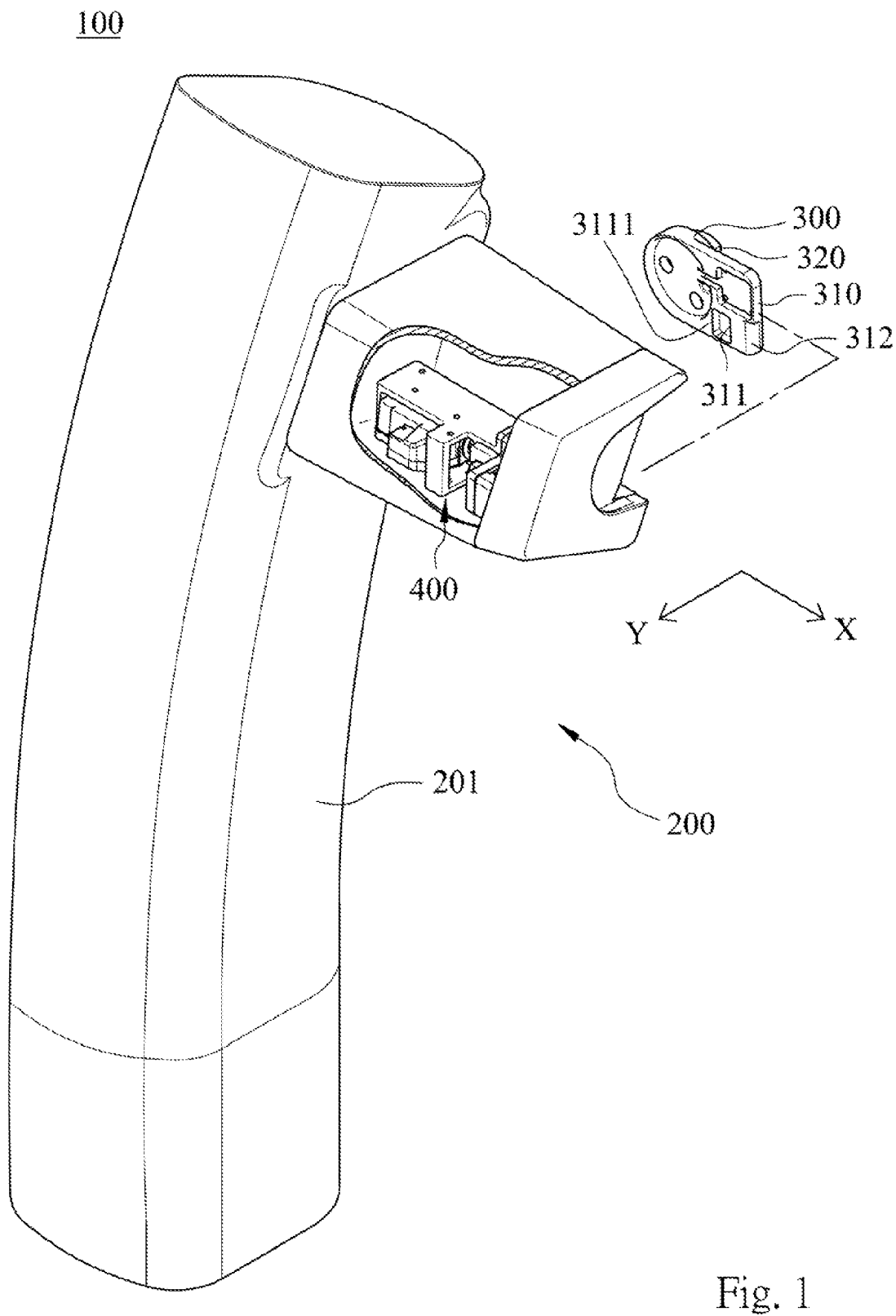
FIG. 1 is a perspective view of the parking seat according to of embodiment of the present disclosure.

Reference will now be made in detail to the embodiments of the present disclosure, examples of which are illustrated in the accompanying drawings. Wherever possible, the same reference numbers are used in the drawings and the description to refer to the same or like parts.

Figure 2:
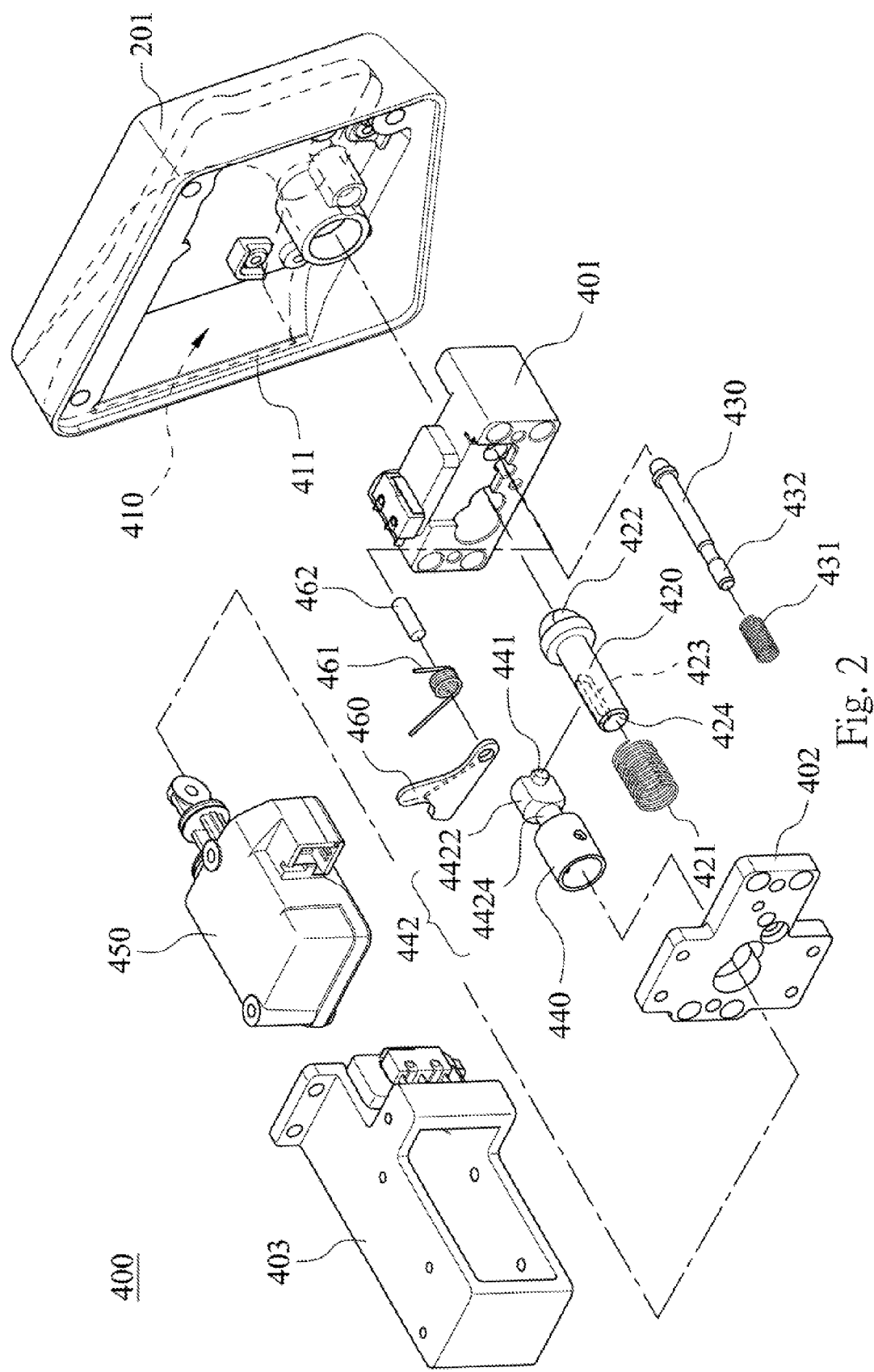
FIG. 2 is an exploded view of the bicycle locking mechanism according to one embodiment of the present disclosure.
Figure 3:
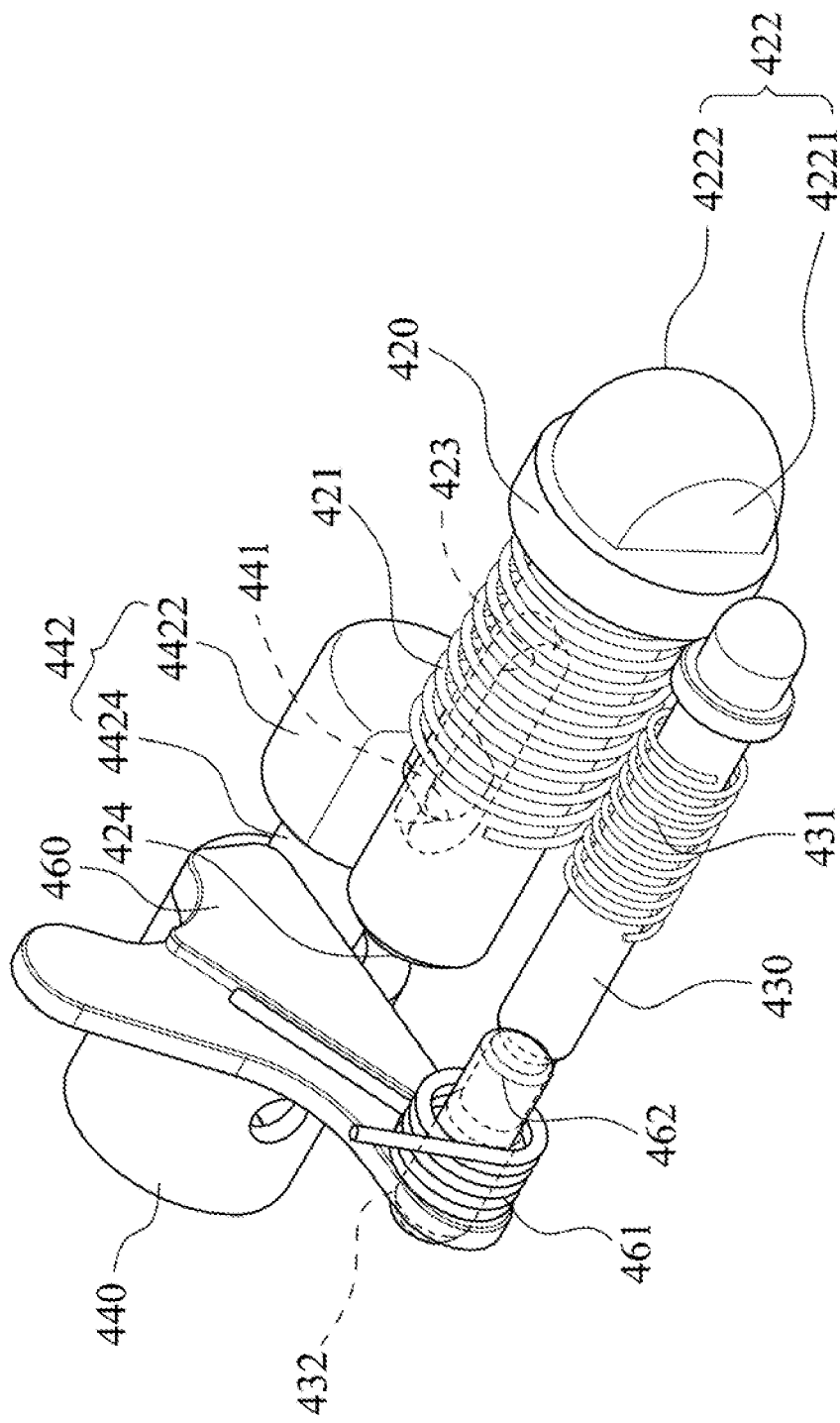
FIG. 3 is a perspective view of a part of the bicycle locking mechanism shown in FIG. 2.

FIG. 1 is a perspective view of the parking seat according to one embodiment of the present disclosure. FIG. 2 is an exploded view of the bicycle locking mechanism, and FIG. 3 is a perspective view of a part of the bicycle locking mechanism.

The present disclosure provides the bicycle locking and parking device 100 for parking a bicycle. The bicycle locking and parking device 100 comprises a parking seat 200 and a locking unit 300, and the parking seat 200 and the locking unit 300 can be locked or released with each other. A bicycle locking mechanism 400 is installed in the parking seat 200. The bicycle locking mechanism 400 corresponds to a fork of the bicycle, and the locking unit 300 is protrudedly mounted on an outside of the fork of the bicycle. Therefore, the locking unit 300 can follow the bicycle forward and lock in the parking seat 200, and the locking unit 300 is suitable for different kinds and brands of bicycle.

The parking seat 200 includes a seat body 201, and an opening space is located at outside of the seat body 201. The opening space is for placing the wheel of the bicycle.

The locking unit 300 has a positioning end 310 and a combination end 320, and a positioning groove 311 is located at outside of the positioning end 310. In addition, an outside of the locking unit 300 has a arch-shaped surface 312, and an outside end 3111 vertically located in the recessed opening of the positioning groove 311.

The bicycle locking mechanism 400 includes a base 401, a cover 402, a mechanism body 403, a locking groove 410, a control module 450, a first locking member 420, a second locking member 430, a third locking member 440, and a reciprocating displacement limiter 460. The locking groove 410 can be integrally installed in the seat body 201 or the locking groove 410 can be formed between the base 401 and the seat body 201 (see FIG. 2). The locking groove 410 has an opening 411 that corresponds with the forward direction of the bicycle, and the opening 411 is tapered to form a horn-shape. The shape of the locking unit 300 corresponds with the shape of the locking groove 410.

In the foregoing, the first locking member 420, the second locking member 430, the third locking member 440, the control module 450, and the reciprocating displacement limiter 460 are located on the mechanism body 403 and the base 401.

The first locking member 420 is rod shaped, and the first locking member 420 couples with a spring 421 to be telescopically located and limited at the cover 402 along an X-axis direction. The first locking member 420 has a reset force from the spring 421, and a front end of the first locking member 420 has a positioning convex 422 that corresponds with the positioning groove 311. In addition, a back end of the first locking member 420 has a lock-in part 424, and the positioning convex 422 of the first locking member 420 is telescopically located and limited at the locking groove 410 along the X-axis direction. A side of the first locking member 420 has a limiting track 423. The positioning convex 422 has a plane 4221 and a curved surface 4222 that are opposite to each other, and the curved surface 4222 cooperates with the arch-shaped surface 312 of the locking unit 300 to form a smooth operation. When the parking seat 200 and the locking unit 300 are locked, the plane 4221 can locate and push an outside end 3111 of the positioning groove 311 (see FIG. 4F).

A reciprocating displacement limiter 460 has a reset force by a spring 461, and the reciprocating displacement limiter 460 is pivoted at the base 401 of the bicycle locking mechanism 400 by a pivot member 462. The reciprocating displacement limiter 460 corresponds with the lock-in part 424 of the first locking member 420, and the reciprocating displacement limiter 460 can be reciprocally embedded in or ejected out a displacement path of the lock-in part 424. Therefore, the reciprocating displacement limiter 460 can lock or unlock the first locking member 420.

The second locking member 430 has a reset force by a spring 431 and the second locking member 430 is telescopically located and limited at the mechanism body 403 along the X-axis direction. A front end of the second locking member 430 has a circular arc shape and is telescopically located and limited at the locking groove 410 along the X-axis direction. In addition, another end of the second locking member 430 has a blocker 432 that can open or close a pivotal displacement path of the reciprocating displacement limiter 460. Therefore, the second locking member 430 can lock or unlock the reciprocating displacement limiter 460, and the second locking member 430 will indirectly lock or unlock the first locking member 420.

The third locking member 440 is telescopically located and limited at the mechanism body 403 along the X-axis direction, and the third locking member 440 has a guider 441 that is located and limited in the limiting track 423. The third locking member 440 has a push surface 442 that has a ladder shape, and the ladder shape has a higher step 4422 and a lower step 4424. The push surface 442 reciprocally pushes the reciprocating displacement limiter 460.

The control module 450 is electrically or manually driven and is disposed at the mechanism body 403 disposed on the parking seat 200. The control module 450 drives the third locking member 440 to form telescopic displacement. When the control module 450 drives the third locking member 440, the push surface 442 reciprocally pushes the reciprocating displacement limiter 460 to form pivotal movement. The control module 450 can reciprocally drive the reciprocating displacement limiter 460 to lock or unlock the displacement path of the lock-in part 424 of the first locking member 420. Therefore, the positioning convex 422 of the first locking member 420 can insert the positioning groove 311 or eject from the positioning groove 311.

FIG. 4A or FIG. 4B is a partial cross-sectional view when the bicycle locking mechanism 400 is locking the locking unit 300 and FIG. 4C or FIG. 4D is another partial cross-sectional view when the locking unit 300 is continued to engage into the locking groove 410 of the bicycle locking mechanism 400. FIG. 4E or FIG. 4F is another partial cross-sectional view when the locking unit 300 is locked at the bicycle locking mechanism 400. FIG. 4G or FIG. 4H is another partial cross-sectional view of the bicycle locking mechanism 400 when the bicycle locking mechanism 400 is unlocking the locking unit 300.

When the control module 450 keeps extended, the bicycle locking and parking device 100 is waiting to lock the locking unit 300. The locking groove 410 of the bicycle locking mechanism 400 inside doesn't have the locking unit 300. In the foregoing, the second locking member 430 is extendedly located at the locking groove 410 by the reset force of the spring 431. Therefore, the blocker 432 can extendedly push the reciprocating displacement limiter 460, and the reciprocating displacement limiter 460 is pushed to do a pivotal movement and does not close the displacement path of the lock-in part 424 of the first locking member 420. Then, the second locking member 430 can unlock the reciprocating displacement limiter 460 and the first locking member 420. At the same time, the positioning convex 422 of the first locking member 420 is extendedly located at the locking groove 410 along the X-axis direction by the spring 421, and the front end of the second locking member 430 keeps extended and is located at the locking groove 410 by the spring 431.

In FIG. 4D, the locking unit 300 starts to enter the locking groove 410 of the bicycle locking mechanism 400. The first locking member 420 is pushed by the locking unit 300, and the second locking member 430 is extendedly located at the locking groove 410 by the reset force of the spring 431. At the same time, the first locking member 420 can do a telescopic displacement because the first locking member 420 keeps staying on the pivotal displacement path of the reciprocating displacement limiter 460. The guider 441 of the third locking member 440 can freely move in the limiting track 423, thus the third locking member 440 is unaffected.

In FIG. 4F, the locking unit 300 is fully entered into the locking groove 410 of the bicycle locking mechanism 400. The positioning convex 422 of the first locking member 420 is locked at the positioning groove 311 to finish the locking operation, because the first locking member 420 is pushed outwardly along the X-axis direction by the spring 421. At the same time, the second locking member 430 is pushed by the locking unit 300, and the blocker 432 of the second locking member 430 does not extendedly push the reciprocating displacement limiter 460. Therefore, the reciprocating displacement limiter 460 is pivotally moved and the displacement path of the lock-in part 424 is closed by the reciprocating displacement limiter 460. The blocker 432 cooperates with the pivotal displacement path of the reciprocating displacement limiter 460, and the reciprocating displacement limiter 460 is locked by the second locking member 430, and the first locking member 420 is indirectly locked by the second locking member 430.

In FIG. 4H, when the control module 450 is electrically driven to be drawn back, the guider 441 of the third locking member 440 will cooperate with the limiting track 423 to pull the first locking member 420. At the same time, the third locking member 440 is linked up to the control module 450. The control module 450 cooperates with the push surface 442 to push the reciprocating displacement limiter 460 to a higher step 4422 of the ladder shape. Therefore, the displacement path of the lock-in part 424 is opened by the reciprocating displacement limiter 460, and the first locking member 420 is moved back and followed with the third locking member 440. At the same time, the positioning convex 422 of the first locking member 420 can be drawn back from the positioning groove 311.

Finally, the locking unit 300 is unlocked from the locking groove 410 of the bicycle locking mechanism 400, and the control module 450 is electrically driven to be extended. The pivotal displacement path of the reciprocating displacement limiter 460 is opened by the third locking member 440. The positioning convex 422 of the first locking member 420 is extendedly located at the locking groove 410 along the X-axis direction by the spring 421. The bicycle locking and parking device 100 is waiting to lock the locking unit 300.

Figure 5:
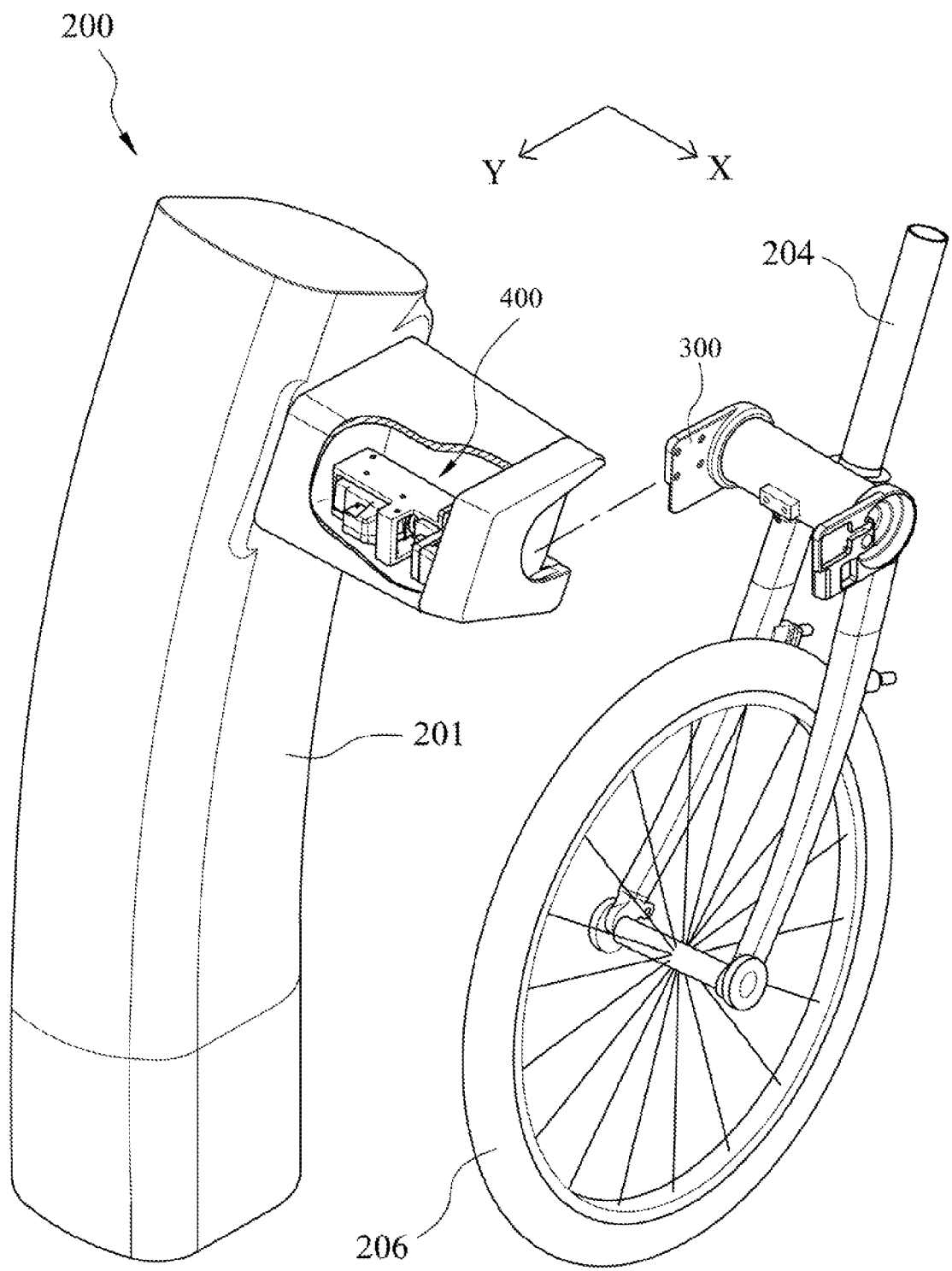
FIG. 5 is a perspective showing an operation of the parking seat according to another embodiment of the present disclosure.
Figure 6:
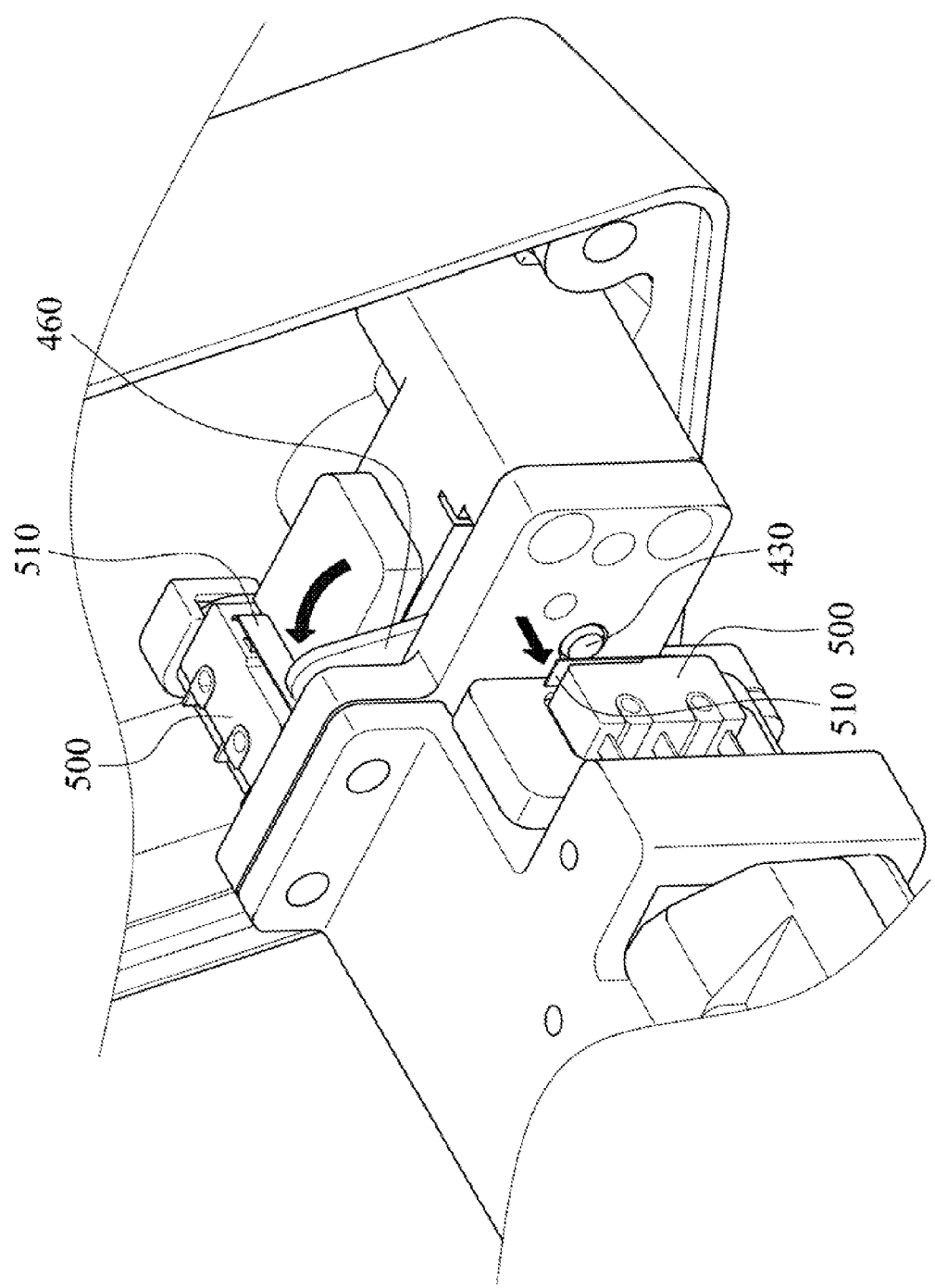
FIG. 6 is a perspective showing an operation of the bicycle locking mechanism that has two sensors.

FIG. 5 or FIG. 6 is a perspective showing an operation of the bicycle locking mechanism that has two sensors 500. In FIG. 6, the reciprocating displacement limiter 460 and the second locking member 430 of the bicycle locking mechanism 400 each has a sensor 500, and each of the two sensors 500 has a contacted part 510 overhanging from them. Therefore, the two sensors 500 can sense and transfer a data for an electrical control system, and the present disclosure can easy manage the public bicycle system.

Moreover, the present disclosure has been described in considerable detail with reference to certain embodiments thereof. The present disclosure can avoid the adverse effects of power cut, and the bicycle rider can lock and park his bicycle at the bicycle safety locking system without power. Any kind of bicycle can install the locking unit on the outside surface of a fork, a front wheel axle or a back wheel axle. Therefore, the present disclosure is suitable for different kinds and brands of bicycle.

It will be apparent to those skilled in the art that various modifications and variations can be made to the structure of the present disclosure without departing from the scope or spirit of the invention in view of the foregoing, it is intended that the present disclosure cover modifications and variations of this invention provided they fall within the scope of the following claims.

What is claimed is:

1. A bicycle locking and parking device for parking a bicycle, the bicycle locking and parking device comprising:
    a parking seat;
    a control module disposed on the parking seat;
    a locking unit having a positioning groove and being prominently mounted on an outside of the bicycle;
    a bicycle locking mechanism disposed on the parking seat, wherein the bicycle locking mechanism comprises:
        a locking groove having an opening that faces toward a rearward direction of the bicycle, and the locking unit can be placed and locked in the locking groove by the opening;
        first locking member having a reset force and being telescopically located and blocked at the locking groove along an X-axis direction, a front end of the first locking member having a positioning convex that corresponds with the positioning groove, a back end of the first locking member having a lock-in part, and a side of the first locking member having a limiting track;
        a reciprocating displacement limiter having a reset force and being located at the bicycle locking mechanism, the reciprocating displacement limiter corresponding with the lock-in part and can open or close a displacement path of the lock-in part;
        a second locking member having a reset force and being telescopically located and blocked at the locking groove along the axis, the second locking member having a blocker that can open or close a displacement path of the reciprocating displacement limiter;
        a third locking member being telescopically located and blocked at the bicycle locking mechanism along the X-axis direction, the third locking member having a guider that is located and blocked in the limiting track, and the third locking member having a push surface that reciprocally pushes the reciprocating displacement limiter, and the third locking member being extendably controlled by the control module;
    wherein the control module drives the third locking member, the control module cooperates with the second locking member to make the displacement path of the lock-in part being closed by the reciprocating displacement limiter, the positioning convex is embedded to the positioning groove, and the locking unit is locked in the bicycle locking mechanism.

2. The bicycle locking and parking device of claim 1, wherein the reciprocating displacement limiter is pivoted on the bicycle locking mechanism, and the reset force of the reciprocating displacement limiter is a spring.

3. The bicycle locking and parking device of claim 1, wherein an outside of the locking unit has a arch-shaped surface, and the arch-shaped surface cooperates with the second locking member that is located in the locking groove.

4. The bicycle locking and parking device of claim 3, wherein the positioning convex has a plane and a curved surface that are opposite to each other, the curved surface cooperates with the arch-shaped surface, and the plane cooperates with an outside end of the positioning groove.

5. The bicycle locking and parking device of claim 1, wherein the parking seat comprises a seat body, and the seat body is connected to the bicycle locking mechanism.

6. The bicycle locking and parking device of claim 2, wherein the parking seat comprises a seat body, and the seat body is connected to the bicycle locking mechanism.

7. The bicycle locking and parking device of claim 3, wherein the parking seat comprises a seat body, and the seat body is connected to the bicycle locking mechanism.

8. The bicycle locking and parking device of claim 4, wherein the parking seat comprises a seat body, and the seat body is connected to the bicycle locking mechanism.

9. A bicycle locking and parking device for parking a bicycle, the bicycle locking and parking device comprising:
    a parking seat;
    a control module being electrically driven and disposed on the parking seat;
    a locking unit having a positioning groove and being prominently mounted on an outside of the bicycle;
    a bicycle locking mechanism disposed on the parking seat, wherein the bicycle locking mechanism comprises:
        a locking groove having an opening that faces toward a rearward direction of the bicycle, and the locking unit can be placed and locked in the locking groove by the opening;
        a first locking member having a reset force and being telescopically located and blocked at the locking groove along an X-axis direction of the bicycle, a front end of the first locking member having a positioning convex that corresponds with the positioning groove, a back end of the first locking member having a lock-in part, and a side of the first locking member having a limiting track;
        a reciprocating displacement limiter having a reset force and being located at the bicycle locking mechanism, the reciprocating displacement limiter corresponding with the lock-in part and can open or close a displacement path of the lock-in part;
        a second locking member having a reset force and being telescopically located and blocked at the locking groove along the axis, the second locking member having a blocker that can open or close a displacement path of the reciprocating displacement limiter;

a third locking member being telescopically located and blocked at the bicycle locking mechanism along the X-axis direction, the third locking member having a guider that is located and blocked in the limiting track, and the third locking member having a push surface that reciprocally pushes the reciprocating displacement limiter, and the third locking member being extendably controlled by the control module;

wherein the control module drives the third locking member, and the control module cooperates with the second locking member and the push surface to make the displacement path of the lock-in part being opened by the reciprocating displacement limiter, and the positioning convex is unlocked from the positioning groove for releasing the locking unit out of the bicycle locking mechanism.

10. The bicycle locking and parking device of claim 9, wherein the parking seat comprises a seat body, and the seat body is connected to the bicycle locking mechanism.

11. The bicycle locking and parking device of claim 9, wherein the reciprocating displacement limiter is pivoted on the bicycle locking mechanism, and the reset force of the reciprocating displacement limiter is a spring.

12. The bicycle locking and parking device of claim 9, wherein an outside of the locking unit has a arch-shaped surface, and the arch-shaped surface cooperates with the second locking member that is located in the locking groove.

13. The bicycle locking and parking device of claim 12, wherein the positioning convex has a plane and a curved surface that are opposite to each other, the curved surface cooperates with the arch-shaped surface, and the plane cooperates with an outside end of the positioning groove.

* * * * *